United States Patent
Rothman et al.

(10) Patent No.: US 7,542,467 B2
(45) Date of Patent: *Jun. 2, 2009

(54) OUT-OF-BAND PLATFORM SWITCH

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 11/092,207

(22) Filed: Mar. 28, 2005

(65) Prior Publication Data

US 2006/0215659 A1    Sep. 28, 2006

(51) Int. Cl.
*H04L 12/28* (2006.01)
*H04L 12/56* (2006.01)

(52) U.S. Cl. .................. 370/389; 370/392; 370/395.31

(58) Field of Classification Search ................ 370/216, 370/217, 218, 219, 220, 221, 225, 231, 235, 370/242, 244, 250, 251, 360, 395.31
See application file for complete search history.

(56) References Cited

U.S. PATENT DOCUMENTS

| | | | |
|---|---|---|---|
| 6,292,495 B1 * | 9/2001 | Von Hammerstein et al. | 370/465 |
| 6,385,211 B1 * | 5/2002 | Williams et al. | 370/469 |
| 6,728,214 B1 | 4/2004 | Hao et al. | |
| 2002/0118644 A1 * | 8/2002 | Moir | 370/230.1 |
| 2003/0026246 A1 | 2/2003 | Huang et al. | |
| 2003/0039258 A1 | 2/2003 | Tuck et al. | |
| 2003/0117973 A1 | 6/2003 | Thermond et al. | |
| 2003/0198215 A1 | 10/2003 | Merrill et al. | |
| 2004/0139246 A1 | 7/2004 | Arimilli et al. | |
| 2004/0255172 A1 * | 12/2004 | Dayan et al. | 713/300 |
| 2004/0267918 A1 * | 12/2004 | Guarraci et al. | 709/223 |
| 2005/0002405 A1 * | 1/2005 | Gao | 370/401 |
| 2005/0135256 A1 | 6/2005 | Ball et al. | |
| 2006/0126495 A1 * | 6/2006 | Guichard et al. | 370/216 |
| 2006/0190532 A1 * | 8/2006 | Chadalavada | 709/203 |
| 2007/0245165 A1 * | 10/2007 | Fung | 713/320 |

OTHER PUBLICATIONS

Nair, Biju, "Easier Home Wi-Fi Networking Using Soft Access and Routing Points," Home Toys Article, Feb. 2004, pp. 1-2, http://www.hometoys.com/htinews/feb04/articles/pctel/sam.htm (retrieved Mar. 25, 2005).
"Non-Final Office Action received for U.S. Appl. No. 11/320,945 mailed on Aug. 20, 2008", 13 pgs.
Final Office Action received for U.S. Appl. No. 11/320,945 mailed on Jan. 27, 2009, 12 pgs.

* cited by examiner

*Primary Examiner*—Chirag G Shah
*Assistant Examiner*—Ashley L Shivers
(74) *Attorney, Agent, or Firm*—Christopher K. Gagne (57) ABSTRACT

A packet is received from a network at an out-of-band (OOB) network interface of an OOB platform switch of a computer system. A destination of the packet is identified. A next hop is determined along a path the packet may be routed to reach the destination. The packet is forwarded to the next hop via the OOB network interface by the OOB platform switch.

24 Claims, 6 Drawing Sheets

OUT-OF-BAND PLATFORM SWITCH

BACKGROUND

1. Field

Embodiments of the invention relate to the field of computer systems and more specifically, but not exclusively, to an out-of-band (OOB) platform switch.

2. Background Information

An enterprise network may include several networks spread across a single building or across the entire globe. A typical enterprise network includes various network forwarding devices, such as routers and switches, to direct network traffic. Network forwarding devices are vulnerabilities in an enterprise network because they present single points of failure in the network infrastructure. Further, routers and switches are expensive pieces of hardware that may strain the Information Technology (IT) budgets of small to medium businesses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
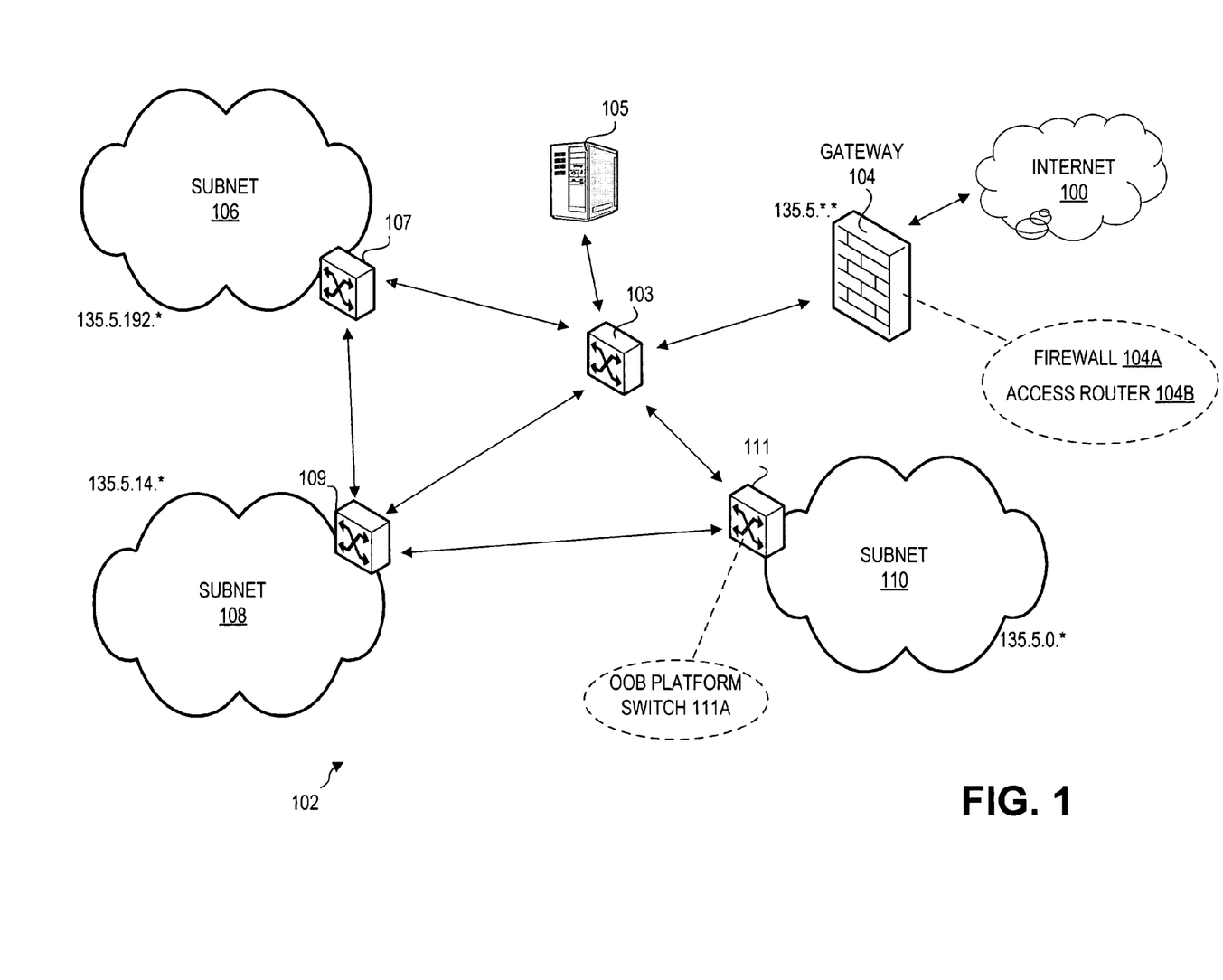
FIG. 1 is a block diagram illustrating an enterprise having out-of-band platform switches in accordance with one embodiment of the present invention.

Turning to FIG. 1, an embodiment of an enterprise network 102 is shown. In general, an enterprise is an organization that utilizes computer systems. Such organizations include, but are not limited to, corporations, small businesses, non-profit institutions, government bodies, or the like. While embodiments herein are described in relation to an enterprise network, it will be appreciated the embodiments of the invention may be implemented in other networked systems. Further, it will be understood that embodiments of the present invention are not limited to a network topology as shown in FIG. 1.

Enterprise network 102 is connected to public Internet 100 using gateway 104. In one embodiment, gateway 104 includes a firewall 104A and an access router 104B. Firewall 104A provides security for enterprise network 102 to prevent unauthorized access to enterprise resources from Internet 100. Access router 104B sends and receives network traffic, in the form of packets, through gateway 104. Gateway 104 may also include a proxy server (not shown) to provide security features, management control, and caching of web pages requested by users of enterprise network 102. In another embodiment, enterprise network 102 may be connected to another network (not shown) through gateway 104 using a private connection.

Enterprise network 102 includes various networks connected together by network forwarding devices. Enterprise 102 includes a switch 103 connected to gateway 104. One or more enterprise servers 105 are connected to switch 103. Switches 107, 109, and 111 are each connected to switch 103. Switches 107 and 109 are also directly connected and switches 109 and 111 are directly connected.

The term "switch," also known as a "packet switch," refers to a network forwarding device that may move complete packets from one connection to another. As used herein, a "switch" refers to a network forwarding device capable of layer-2 packet switching, layer-3 packet switching, or both. Switches of enterprise 102 may also include "intelligent" switches, routers, or the like.

In one embodiment, a switch may use a store-and-forward technique in which packets arriving at the switch are placed in a queue awaiting processing. When a stored packet gets to the front of the queue, the packet destination is analyzed and the packet is forwarded to its destination. In one example, the packet may be sent to its final destination, such as a host computer. In another example, the packet may be sent to its next hop, such as another network forwarding device, along an optimal path to the packet's final destination.

Subnet 106 includes switch 107, subnet 108 includes switch 109, and subnet 110 includes switch 111. While enterprise network 102 shows one switch per subnet, it will be understood that a subnet may include two or more switches. Each subnet represents a portion of the entire enterprise network 102. In one embodiment, a subnet includes a Local Area Networks (LAN). Embodiments of switches 107, 109, and 111 include an out-of-band (OOB) platform switch, such as OOB platform switch 111A, as described herein.

In one embodiment, a switch may use a routing table that contains next hop information to be used in routing packets. In one embodiment, the routing table is static and is not updated during a switching session of an OOB platform switch. In another embodiment, the routing table is dynamic and is updated as conditions in the network infrastructure change. In one embodiment, an OOB platform switch provides layer-2 and/or layer-3 packet switching.

Enterprise network 102 may be deployed on a variety of scales. For example, each subnet may represent a network on different floors of an office building. In another example, the subnets may represent networks in different buildings of a business or college campus. And in yet another example, each subnet may be one or more networks in different cities across the world that are all part of a corporate enterprise network.

In one embodiment, enterprise network 102 may be referred to as a Wide Area Network (WAN). Enterprise network 102 may utilize various WAN technologies such as a Frame Relay, a Switched Multi-megabit Data Service (SMDS), and Asynchronous Transfer Mode (ATM).

Embodiments of the present invention will be discussed in terms of Internet Protocol (IP) addressing, but embodiments of the present invention are not limited to IP addressing. Embodiments of the present invention are discussed below in terms of Internet Protocol addressing, version 4, (IPv4). However, it will be understood the embodiments of the invention may be used with IP, version 6, (IPv6) networks.

An IPv4 address is a unique 32-bit address. IP addresses are usually expressed in a dotted decimal notation using four decimal numbers separated by dots. Each decimal number represents an 8-bit field of the 32-bit IP address.

The first part of an IP address identifies the network, also called the network prefix, and the second part of an IP address identifies the host on the network. IP addresses are broken down into classes A-C. IP addressing also includes a class D for multicasting and a class E that is reserved for future use.

The different classes have different boundaries between the network prefix and the host number. Class A uses an 8-bit prefix, class B has a 16-bit prefix, and class C uses a 24-bit prefix.

Class B addresses may be further divided into smaller subnets. Subnetting allows the division of a network address into smaller numbers to prevent a network from running out of IP addresses. In short, the host number is further divided into a subnet number and a host number.

Subnets allow an enterprise network to deploy additional subnets without having to obtain additional IP addresses. Systems outside of the enterprise network do not "see" the subnets, but refer traffic to the network prefix. The network forwarding devices of the enterprise network forward packets to the appropriate subnet/host based on the enterprise network structure.

Subnetting uses a subnet mask. The subnet mask indicates to the enterprise network which portion of the IP address is the subnet number and which portion of the IP address is the host number.

Referring to FIG. 1, gateway 104 has an IP address of 135.5.*.*. Gateway 104 receives packets with the high 16-bits addressed to 135.5. Gateway 104, or another device of enterprise network 102, then examines the IP address for forwarding onto enterprise network 102. Enterprise network 102 is subnetted based on the third octet of the IP address. As shown, subnet 106 has an IP address of 135.5.192.*, subnet 108 has an IP address of 135.5.14.*, and subnet 110 has an IP address of 135.5.0.*.

In enterprise network 102, the subnet mask is 255.255.255.0. The bits in the subnet mask have a one-to-one correspondence to bits in the IP address. Subnet bits set to "1" indicate the IP address bit is part of the network prefix, while a subnet bit set to "0" indicates that portion of the IP address pertains to the host number. It will be understood that embodiments of the invention are not limited to the subnet mask discussed herein. Table 1 below shows how the subnet mask may be applied to an IP address for subnet 110.

TABLE 1

| | | |
|---|---|---|
| IP address: | 135.5.0.5 | 10000111.00000101.00000000.00000101 |
| Subnet mask: | 255.255.255.0 | 11111111.11111111.11111111.00000000 |

Subnetting provides network administrators flexibility in network deployment and also allows for future growth. Subnets may be changed and added within enterprise network 102 without having to obtain a new IP address for the enterprise network. Further, routing tables on Internet 100 do not have to be changed if there are changes to the structure of enterprise network 102 because the Internet routing tables only point to gateway 104 and not to any particular subnets.

Figure 2:
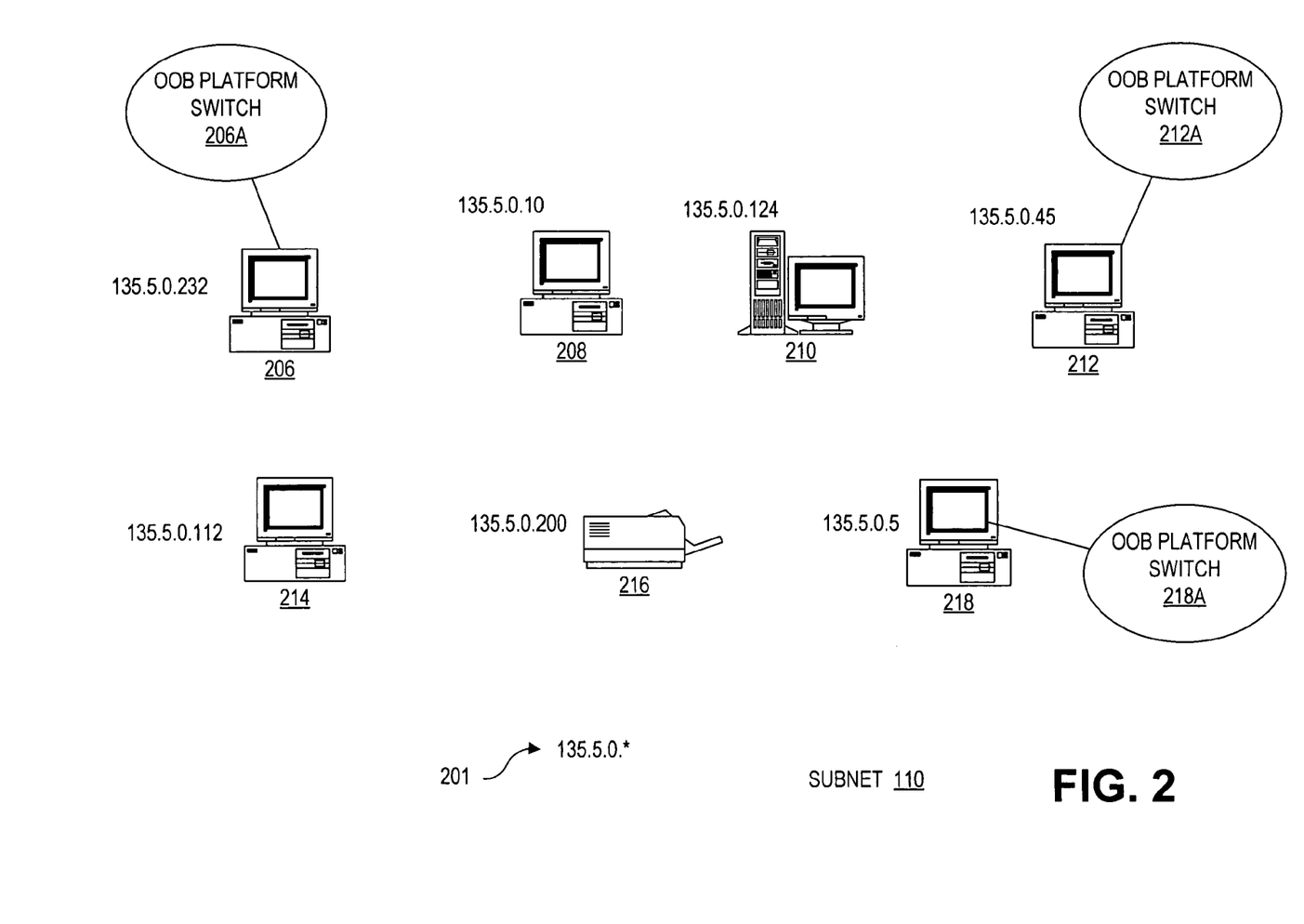
FIG. 2 is a block diagram illustrating a subnet having out-of-band platform switches in accordance with one embodiment of the present invention.

Turning to FIG. 2, an embodiment of subnet 110 is illustrated. Subnet 110 has a subnet address of 135.5.0.*, as shown at 201. Subnet 110 includes hosts 206, 208, 210, 212, 214, 216, and 218. Hosts include, but are not limited to, servers, workstations, desktops, laptops, printers, copiers, fax machines, scanners, or the like. Example IP addresses are shown by each of the hosts in FIG. 2. In one embodiment, IP addresses are assigned using a Dynamic Host Configuration Protocol (DHCP).

Hosts 206, 212, and 218 include the capability to provide OOB platform switches 206A, 212A, and 218A, respectively. The OOB platform switch capability of computer systems may be leveraged as desired by network administrators. The OOB platform switch can be used to supplement and/or replace higher cost specialized switches and routers. Not all machines having OOB platform switch capability have to be employed at the same time. OOB platform switches may be brought up and torn down as needed. In one embodiment, changes in topology of enterprise network 102 may occur automatically through network management software; in another embodiment, enterprise network 102 may be modified manually by a system administrator from a network management console.

An enterprise network having numerous systems with OOB platform switch capability increases the resiliency of the network. OOB platform switch capable machines provide increased packet switching redundancy and multiple back-up switches. Using only specialized switches and routers presents single points of failure in an enterprise network.

The "out-of-band" connection used herein refers to a channel separate from the "normal" network connection of the computer system. The channel normally used for information transfer is referred to as the "in-band" connection. OOB connections are often used in the context of networking for a system administrator to diagnose and remedy a malfunctioning system. The administrator may not be able to use the in-band connection because of a system problem, such as a Transmission Control Protocol/Internet Protocol (TCP/IP) stack failure. The receiving and forwarding of packets by an OOB platform switch may occur on the OOB network connection.

Further, embodiments of "out-of-band" activity herein includes communications and operations performed "behind the scenes" in a manner that is transparent to the operating system (OS) running on the host. As a result, there is no operating system complicity, such as from an OS driver, involved in packet processing by the OOB platform switch.

Also, packet switching by an OOB platform switch may occur during pre-boot as well as OS runtime. The pre-boot phase of a computer system is generally defined as the time period between the processor reset and the Operating System (OS) load when firmware instructions are executed. Such firmware instructions may include the computer system's Basic Input/Output System (BIOS). At the start of pre-boot, it is up to the code in the firmware to initialize the system to the point that an operating system can take over. The start of the OS load begins the period commonly referred to as OS runtime. During OS runtime, the firmware may act as an interface between software and hardware components of a computer system as well as perform other system tasks.

Figure 3:
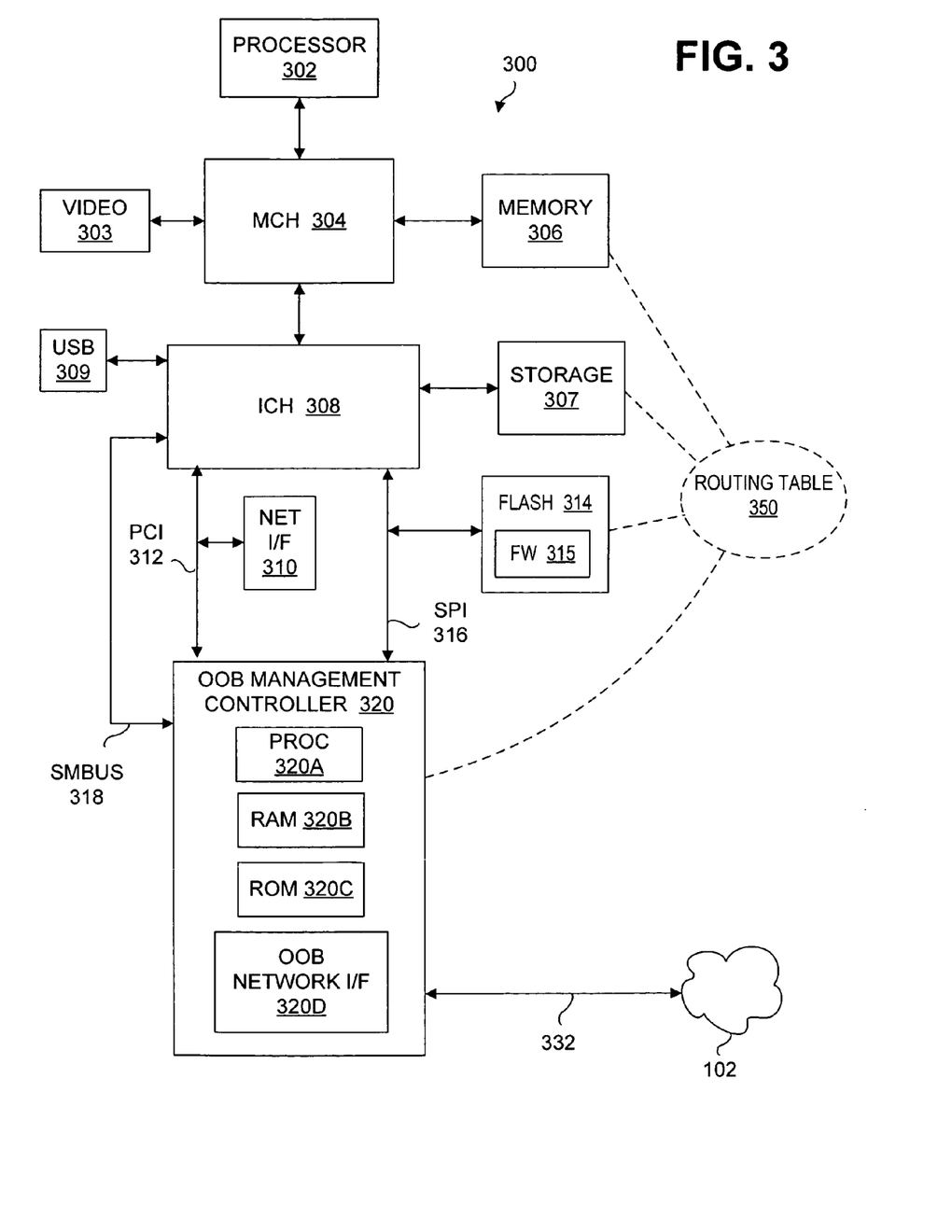
FIG. 3 is a block diagram of an out-of-band platform switch in accordance with one embodiment of the present invention.

Turning to FIG. 3, a computer system 300 having an OOB platform switch in accordance with an embodiment of the present invention is shown. As described below, the OOB platform switch of system 300 includes an OOB management controller 320. In one embodiment, OOB management controller 320 is part of the chipset of system 300 and may provide packet inspection and routing capabilities to serve as an OOB platform switch.

Computer system 300 includes an Input/Output (I/O) Controller Hub (ICH) 308 coupled to a Memory Controller Hub (MCH) 304. In one embodiment, ICH 308 serves as an I/O controller and MCH 304 serves as a memory controller.

A processor 302 and memory 306 are coupled to MCH 204. Processor 302 may include one or more processors for executing instructions for system 300. In one embodiment, processor 302 includes a Central Processing Unit (CPU). In one embodiment, processor 302 may be considered an in-band processor because processor 302 executes instructions associated with an OS of computer system 300, instructions (e.g., applications) that are managed by the OS, or instructions associated with processes that the OS is aware of. A video connection 303, such as an Advanced Graphics Port (APG), PCI Express port, or the like, may be coupled to MCH 304.

Storage 307 is coupled to ICH 308. In one embodiment, storage 307 includes a hard disk drive coupled to ICH 308 using an Advanced Technology Attachment (ATA) interface. Other storage devices, such as a floppy disk drive, an optical disk drive, or the like, may also be coupled to ICH 308. An external port, such as Universal Serial Bus (USB) port 309, may also be coupled to ICH 308

A System Management Bus (SMBUS) 318, a Peripheral Component Interface (PCI) bus 312, and a Serial Peripheral Interface (SPI) 316, or any combination thereof may be coupled to ICH 208. PCI interconnect 312 may include PCI-X, PCI Express, or the like.

In one embodiment, a network interface (I/F) 310 may be coupled to PCI interconnect 312. Network interface 310 may be used to send and receive in-band communications. Embodiments of network I/F 310 include a Network Interface Card (NIC), a modem, or the like.

Computer system 300 may include a Flash memory 314 coupled to SPI 316. In one embodiment, Flash memory 314 has stored firmware instructions, such as a BIOS, for system 300. In alternative embodiments, other types of non-volatile storage, such as Read-Only Memory (ROM), may be used in place of or in conjunction with Flash memory 314. In one embodiment, instructions for supporting an OOB platform switch according to embodiments described herein may be stored in Flash memory 314 or storage 307. The embodiment of FIG. 3 shows OOB platform switch firmware instructions 315 stored in Flash memory 314.

OOB management controller 320 may be coupled to ICH 308 by SMBUS 318, PCI 312, SPI 316, or any combination thereof. In one embodiment, OOB management controller 320 is part of the same chipset as MCH 304 and ICH 308 that are coupled to a single board.

In one embodiment, OOB management controller 320 may be used to send and receive OOB communications for system 300. OOB management controller 320 may be used by a system administrator to access and manage system 300 through a management console. However, since the OOB management controller 320 may be used very little (less than 1% of the time), its OOB networking and processing capabilities may be used to implement an OOB platform switch.

OOB management controller 320 may include a processor 320A for executing instructions provided to OOB management controller 320. OOB management controller 320 may include Random Access Memory (RAM) 320B and Read-Only Memory (ROM) 320C coupled to processor 320A by a bus (not shown). In one embodiment, ROM 320C has stored instructions for providing an OOB platform switch according to embodiments herein.

In one embodiment, OOB management controller 320 may include an OOB network interface (I/F) 320D for communicating over enterprise network 102. Controller 320 may communicate over network 102 during the pre-boot phase and OS runtime of system 300. In one embodiment, OOB network I/F 320D includes an Ethernet compatible connection.

In one embodiment, OOB management controller 320 and its network capabilities are not known to the user, but OOB management controller 320 is used in the background during pre-boot and runtime phases of system 300. In one embodiment, OOB management controller 320 is initialized at the beginning of startup of computer system 300. In this particular embodiment, the firmware may initialize the OOB management controller 320 when processor 302 is initialized. In this way, OOB management controller 320 is running and active before the firmware continues to more initializing tasks. Thus, OOB management controller 320 may send and receive network communications using OOB network I/F 320D and may execute instructions using processor 320A during pre-boot of system 300. In one embodiment, processor 320A may be considered an OOB processor because processor 320A is executing instructions instead of the in-band processor complex, such as processor 302. Such an OOB processor may execute instructions regardless of the state of processor 302.

In another embodiment, OOB management controller 320 is active during a standby power state, such as a sleep state, of system 300. Thus, OOB management controller 320 may conduct packet switching when system 300 is in a sleep state. In one example, when a user of host 206 in FIG. 2 goes home for the night, host 206 may drop into a sleep state because of inactivity. However, OOB platform switch 206A may continue handling packets via OOB management controller 320.

In one embodiment, OOB management controller 320 may have access to various platform devices during pre-boot as well as OS runtime. In another embodiment, OOB management controller 320 may interact with memory 306. In yet another embodiment, OOB management controller 320 has access to storage 307 via ICH 308.

In one embodiment, a routing table 350 is stored on computer system 300 for use by OOB management controller 320. Routing table 350 may be stored in memory 306, storage 307, flash 314, RAM 320B, ROM 320C, or any combination thereof. In another embodiment, if routing table 350 is stored in a volatile storage, such as memory 306, then routing table 350 may be moved to non-volatile storage, such as flash 314, when system 300 is shutdown or packet switching is disabled. In this way, routing table 350 may not have to be rebuilt from scratch if system 300 is re-enabled as an OOB platform switch.

In another embodiment, routing table 350 may be stored on another system of enterprise network 102 that is accessible by OOB management controller 320.

Figure 4:
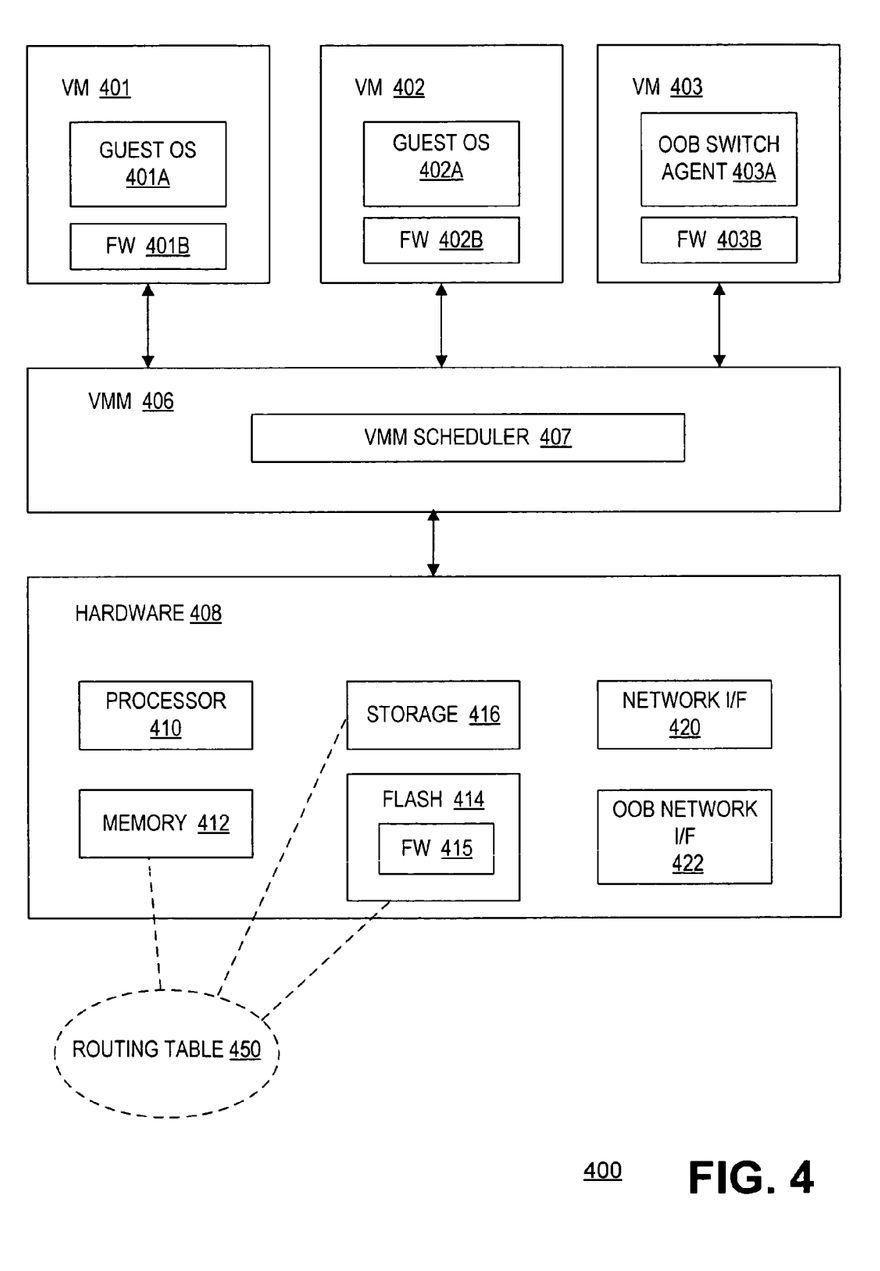
FIG. 4 is a block diagram of an out-of-band platform switch in accordance with one embodiment of the present invention.

Referring to FIG. 4, a computer system 400 having an OOB platform switch implemented in a virtualization environment in accordance with one embodiment of the present invention is shown. The OOB platform switch of computer system 400 includes an OOB platform switch agent 403A and an OOB network interface 422.

A Virtual Machine (VM) is a software construct that behaves like a complete physical machine. A VM usually has the same features of a physical machine such as expansion slots, network interfaces, disk drives, and Basic Input/Output System (BIOS). Multiple VMs may be set up and torn down on a computer system. Each VM may support a firmware level, a Guest operating system (OS) and associated applications.

A Virtual Machine Monitor (VMM) gives each VM the illusion that the VM is the only physical machine running on the hardware. The VMM is a layer between the VMs and the physical hardware to maintain safe and transparent interactions between the VMs and the physical hardware. Each VM session is a separate entity that is isolated from other VMs by the VMM. If one VM crashes or otherwise becomes unstable, the other VMs, as well as the VMM, should not be adversely affected. In one embodiment, instructions for VMM 406 are stored in Flash memory 414 and are loaded during the pre-boot phase of computer system 400.

Computer system 400 includes a Virtual Machine Monitor (VMM) 406 layered on hardware layer 408. VMM 406 supports Virtual Machines (VMs) 401, 402 and 403.

Hardware layer 408 includes a processor 410, memory 412, storage 416, and Flash memory 414 coupled by one or more busses (not shown). Hardware layer 408 also includes a network I/F 420 and an OOB network I/F 422.

VM 401 includes a Guest OS 401A and firmware 401B, VM 402 includes a Guest OS 402A and firmware 402B, and VM 403 includes OOB platform switch agent 403A and firmware 403B. While embodiments herein are described using Guest OS's, it will be understood that alternative embodiments include other guests, such as a System Management Mode (SMM), running in a VM.

VMM 406 includes a VMM scheduler 407. VMM scheduler 407 coordinates how much access time each VM is provided to processor 410. In one embodiment, each VM may be scheduled an equal amount of time, that is VMs 401-403 may each get one-third access time to processor 410 in a round-robin type scheme. In another embodiment, scheduler 407 may time slice between VM switches by unequal divisions. For example, VM 401 may get access to processor 410 50% of the time, while VM 402 and VM 403 each get access 25% of the time. In one embodiment, VMM scheduler 407 may make adjustments to VM time allocation dynamically while one or more VM sessions are up. In another embodiment, VMM scheduler 407 may make time slicing adjustments when a VM is torn down, or an additional VM is constructed.

VMM 406 keeps OOB network interface 422 from being "seen" or accessible by VMs 401 and 402. OOB network I/F 422 is isolated from the other VMs except for VM 403. Instructions for OOB platform switch agent 403A may be stored in storage 416 or Flash memory 414 for execution by processor 410. In the embodiment of FIG. 4, firmware instructions 415 for OOB platform switch agent 403A are stored in Flash memory 414.

In one embodiment, a routing table 450 may be stored in memory 412, storage 416, Flash memory 414, or any combination thereof. In another embodiment, at least a portion of routing table 450 may be stored on another system of enterprise network 102 that is accessible by computer system 400.

In an alternative embodiment, computer system 400 does not include an OOB network I/F 422, but network I/F 420 is shared by all VMs including VM 403 having OOB platform switch agent 403A. In this particular embodiment, VMM 406 time slices access to network I/F 420. Network I/F 420 is used by VMs 401 and 402 for in-band communications, but when used by VM 403, network I/F 420 is used for OOB communications and takes on the role of an OOB network interface. Since network I/F 420 is listening for packets for packet switching and forwarding such packets, network I/F 420 may spend a majority of its time in the OOB network I/F role.

In one embodiment, VMs 401-403 and/or VMM 406 operate substantially in compliance with the Extensible Firmware Interface (EFI) (*Extensible Firmware Interface Specification*, Version 1.10, Dec. 1, 2002, available at http://developer.intel.com/technology/efi). EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, Version 0.9, Sep. 16, 2003, referred to hereafter as the "Framework" (available at www.intel.com/technology/framework). It will be understood that embodiments of the present invention are not limited to the "Framework" or implementations in compliance with the EFI specification.

Figure 5:
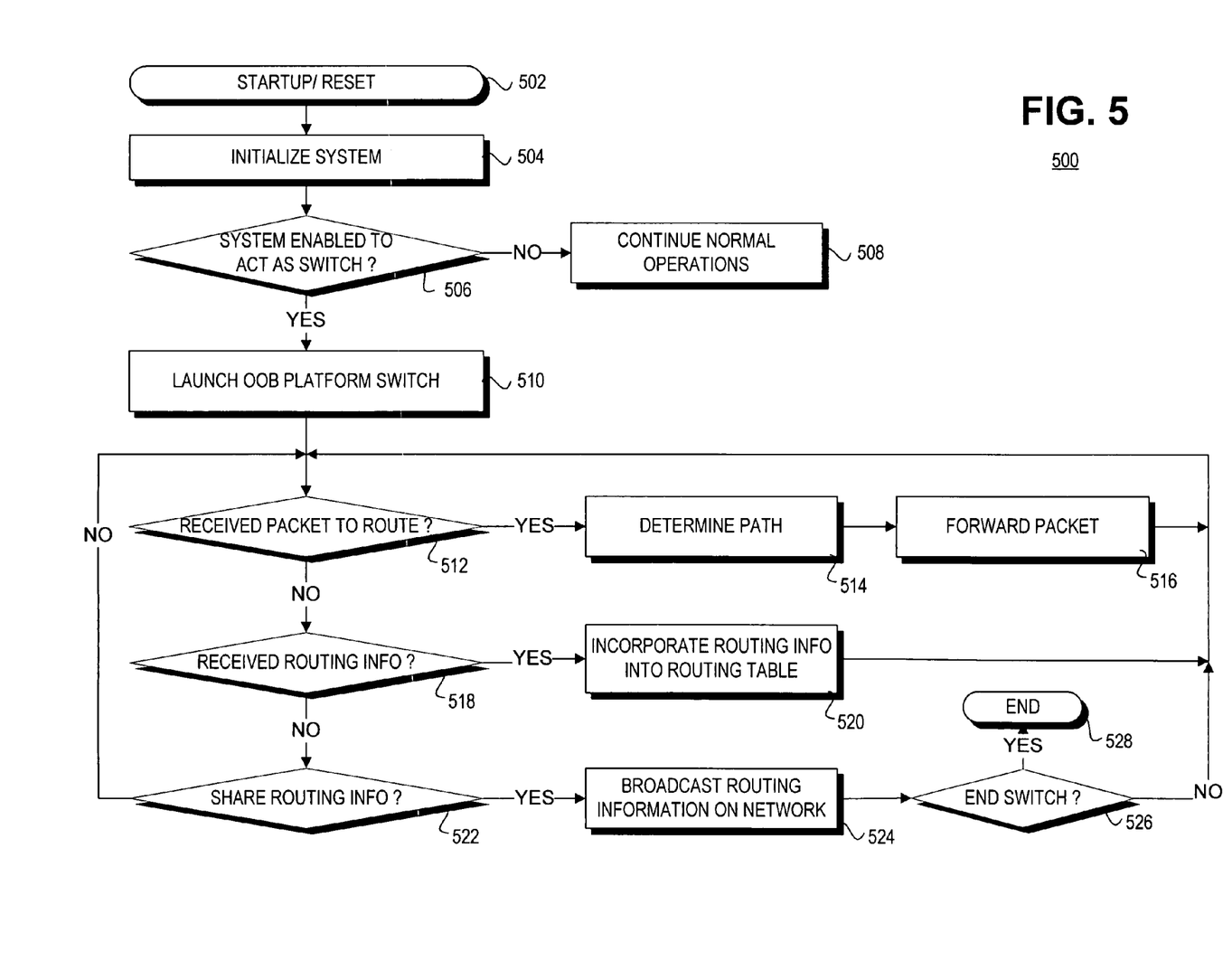
FIG. 5 is a flowchart illustrating the logic and operations of an out-of-band platform switch in accordance with one embodiment of the present invention.

Referring to FIG. 5, a flowchart 500 illustrating the logic and operations of an embodiment of the present invention is shown. In an embodiment using OOB management controller 320, operations described in flowchart 500 may be conducted substantially by instructions executing on processor 320A. In an embodiment using OOB platform switch agent 403A, operations described in flowchart 500 may be substantially executed by processor 410.

Starting in a block 502, the system having the OOB platform switch is started up/reset. Proceeding to a block 504, the computer system is initialized. In one embodiment, instructions stored in non-volatile storage are loaded. In one embodiment, the instructions may begin initializing the system by conducting a Power-On Self-Test (POST) routine. In a virtualization embodiment, a VMM is launched on the platform. In one embodiment, the VMM is loaded from a local storage device, such as Flash memory 414. In another embodiment, the VMM is loaded across a network connection from another computer system.

Continuing to a decision block 506, the logic determines if the platform is enabled to act as an OOB platform switch. If the answer to decision block 506 is no, then the logic proceeds to a block 508 to continue normal operations. If the answer to decision block 506 is yes, then the logic continues to a block 510.

In block 510, the OOB platform switch is launched. In one embodiment, instructions supporting OOB platform switch are loaded and executed by OOB microcontroller 320. In a virtualization embodiment, an OOB platform switch agent and supporting VM are launched.

In another embodiment of block 510, the OOB platform switch polls the enterprise network to gain information about the network infrastructure. The OOB platform switch may use this information to build a routing table from scratch, or to update a previously saved routing table.

It is noted that the OOB platform switch may launch and initialize regardless of a state of an OS executing on the computer system. The OOB platform switch may operate during pre-boot as well as OS runtime, and does not rely on OS support.

Continuing to a decision block 512, the logic determines if the OOB platform switch has received a packet to route. In one embodiment, the packet is received at OOB network I/F 320D of OOB management controller 320. In another embodiment, the packet is received at OOB network I/F 422. If the answer to decision block 512 is yes, then the logic proceeds to a block 514.

In block 514, the logic determines the path of the packet to reach its destination. In one embodiment, the logic examines the packet to determine the destination address of the packet. In another embodiment, the OOB platform switch performs a routing table lookup in a routing table to determine the next hop of the packet.

Continuing to a block 516, the logic forwards the packet to its destination. In one embodiment, the OOB platform switch sends the packet to the next hop in the packet's optimal path to the packet's destination. After block 516, the logic proceeds back to decision block 512.

If the answer to decision block 512 is no, then the logic continues to a decision block 518 to determine if the OOB platform switch has received a distribution of routing information. If the answer to decision block 518 is yes, then the logic continues to a block 520 to incorporate the routing information into the routing table used by OOB platform switch. Another network forwarding device of the enterprise network may broadcast routing data onto the network before being removed from the network so that other network forwarding devices may update their routing tables accordingly. After block 520, the logic then returns to decision block 512.

If the answer to decision block 518 is no, then the logic proceeds to a decision block 522 to determine if the OOB platform switch needs to share its routing information. In one embodiment, the OOB platform switch receives a request from another network forwarding device of enterprise network 102 that is constructing its own routing table.

In another embodiment, an event has occurred on the computer system executing the OOB platform switch. Such an event includes a removal of the OOB platform switch from enterprise network 102. The OOB platform switch may be removed (or added) in response to a management signal from an enterprise network management console. A management console may control an OOB platform switch using an OOB management network communication channel, such as through OOB management controller 320.

Such an event may also include a power off of the system, a transition of the system to an S5 state, or the like. An S5 state is a state defined by the *Advanced Configuration and Power Interface (ACPI) Specification* (version 2.0b, Oct. 11, 2002). ACPI is an industry-standard interface for OS-directed configuration and power management of computer systems, such as laptops, desktops, and servers. In an S5 state, the system is in a soft-off state and requires a complete boot of the system, including BIOS and OS, when the system is awakened.

If the answer to decision block 522 is no, then the logic returns to decision block 512. If the answer to decision block 522 is yes, then the logic continues to a block 524 where the OOB platform switch broadcasts its routing information onto enterprise network 102.

The logic then proceeds to a decision block 526 to determine If the OOB platform switch is to be ended. It will be appreciated that OOB platform switch may be launched and terminated on a computer system without the knowledge of or complicity from the computer system's OS. If the answer to decision block 526 is yes, then the logic proceeds to a block 528 to end the OOB platform switch. If the answer to decision block 526 is no, then the logic returns to decision block 512.

Embodiments of the present invention provide an OOB platform switch for an enterprise network. Instead of paying thousands of dollars to purchase specialized switches and routers, computer systems, such as Intel Architecture (IA) personal computers, may provide packet switching functionality for an enterprise network. In one embodiment, the OOB platform switch uses an out-of-band communication channel for routing of network traffic. In another embodiment, the OOB platform switch operates on a computer system without complicity from an operating system. The OOB platform switch may conduct routing operations regardless of the state of the OS and even when the computer system is in a sleep state. In yet another embodiment, an OOB platform switch session may be started and ended in the background of a computer system. In this way, a system administrator has flexibility in adjusting the switching topology of an enterprise network from a management console.

Figure 6:
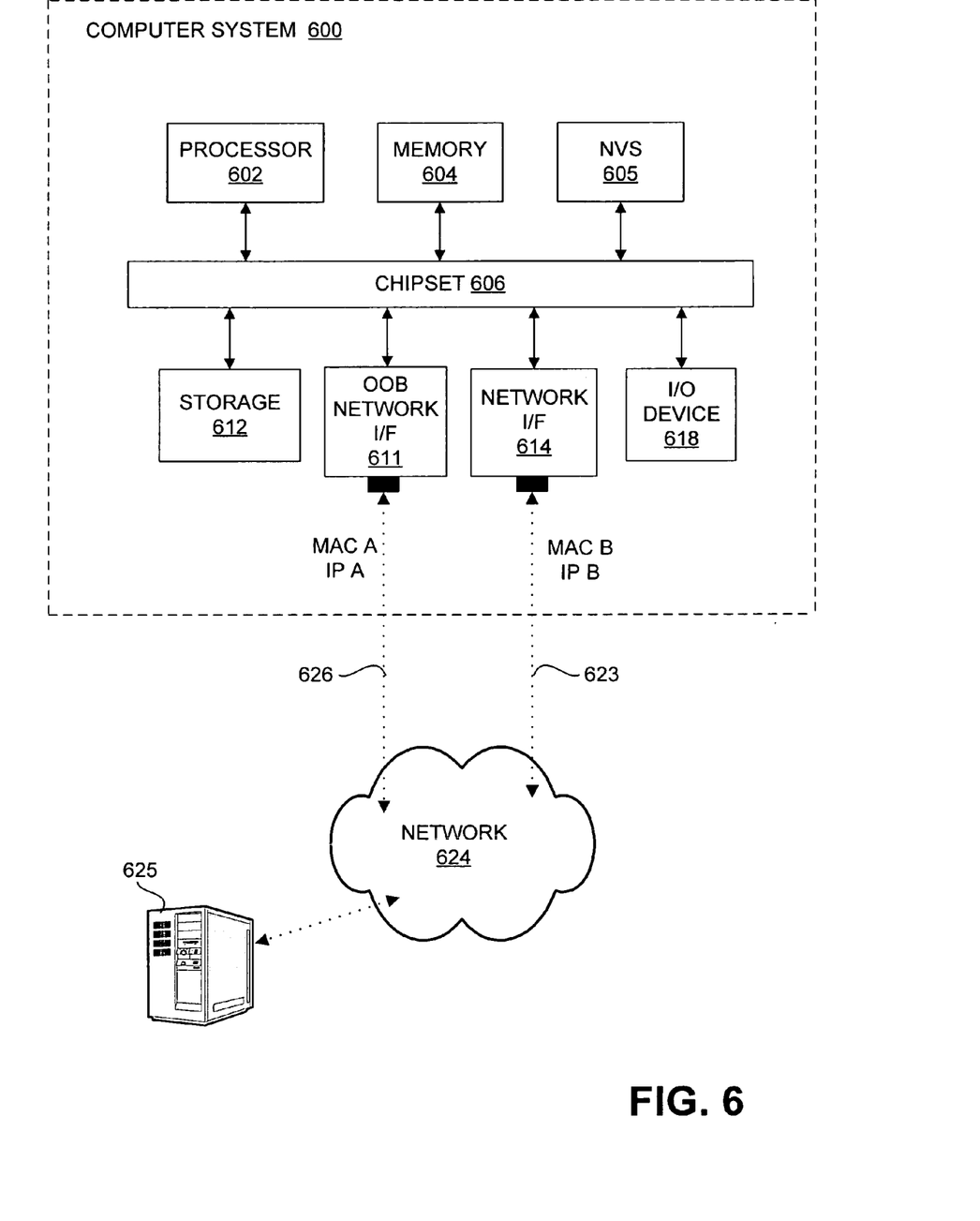
FIG. 6 is a block diagram illustrating one embodiment of a computer system to implement embodiments of the present invention.

FIG. 6 is an illustration of an embodiment a computer system 600 on which embodiments of the present invention may be implemented. Computer system 600 includes a processor 602 and a memory 604 coupled to a chipset 606. Storage 612, Non-Volatile Storage (NVS) 605, network interface (I/F) 614, and Input/Output (I/O) device 618 may also be coupled to chipset 606. Embodiments of computer system 600 include, but are not limited to, a desktop computer, a notebook computer, a server, a personal digital assistant, a network workstation, or the like. In one embodiment, computer system 600 includes processor 602 coupled to memory 604, processor 602 to execute instructions stored in memory 604.

Processor 602 may include, but is not limited to, an Intel Corporation x86, Pentium®, Xeon®, or Itanium® family processor, or the like. In one embodiment, computer system 600 may include multiple processors. In another embodiment, processor 602 may include two or more processor cores.

Memory 604 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 604 may include one or more memory units that do not have to be refreshed.

Chipset 606 may include a memory controller, such as a Memory Controller Hub (MCH), an input/output controller, such as an Input/Output Controller Hub (ICH), or the like. In an alternative embodiment, a memory controller for memory 604 may reside in the same chip as processor 602. Chipset 606 may also include system clock support, power management support, audio support, graphics support, or the like. In one embodiment, chipset 606 is coupled to a board that includes sockets for processor 602 and memory 604.

Components of computer system 600 may be connected by various interconnects. In one embodiment, an interconnect may be point-to-point between two components, while in other embodiments, an interconnect may connect more than two components. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O device 618 may include a keyboard, a mouse, a display, a printer, a scanner, or the like.

The computer system 600 may interface to external systems through network interface 614. Network interface 614 may include, but is not limited to, a modem, a Network Interface Card (NIC), or other interfaces for coupling a computer system to other computer systems. A carrier wave signal 623 may be received/transmitted by network interface 614. In the embodiment illustrated in FIG. 6, carrier wave signal 623 is used to interface computer system 600 with a network 624, such as a Local Area Network (LAN), a Wide Area Network (WAN), the Internet, or any combination thereof. In one embodiment, network 624 is further coupled to a computer system 625 such that computer system 600 and computer system 625 may communicate over network 624.

Computer system 600 may also include an OOB network interface 611 coupled to chipset 606. In one embodiment, OOB network I/F 611 is an integrated component of chipset 606. OOB network I/F 611 may communicate with network 624 using a carrier wave signal 626.

In one embodiment, OOB network interface 611 has an associated Media Access Control (MAC) address A and IP address A, and network interface 614 has an associated MAC address B and IP address B. In this particular embodiment, computer system 600 is viewed by network 624 as having two distinct nodes.

The computer system 600 also includes non-volatile storage 605 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 612 includes, but is not limited to, a magnetic hard disk, a magnetic tape, an optical disk, or the like. It is appreciated that instructions executable by processor 602 may reside in storage 612, memory 604, non-volatile storage 605, or may be transmitted or received via network interface 614.

It will be appreciated that in one embodiment, computer system 600 may execute Operating System (OS) software. For example, one embodiment of the present invention utilizes Microsoft Windows® as the operating system for computer system 600. Other operating systems that may also be used with computer system 600 include, but are not limited to, the Apple Macintosh operating system, the Linux operating system, the Unix operating system, or the like.

In one embodiment, computer system 600 employs the Intel® Vanderpool Technology (VT). VT may provide hardware support to facilitate the separation of VMs and the transitions between VMs and the VMM.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
receiving a packet from a network at an out-of-band (OOB) network interface of an OOB platform switch hosted by a computer system, a processor of the computer system executing an operating system during an operating system runtime that occurs after a pre-boot phase of the computer system, the pre-boot phase being between a reset of the processor and loading of the operating system;
performing, during the pre-boot phase, at least one of layer-2 and layer-3 store-and-forward switching of the received packet, the performing including:
identifying, by examination of the received packet, a destination of the received packet;
determining, via the OOB platform switch, a next hop along a path the received packet may be routed to reach the destination, the determining comprising use of a routing table that contains next hop information that is updated when conditions in the network change; and
forwarding the received packet to the next hop via the OOB network interface;
the identifying of the destination of the received packet and the determining of the next hop being accomplished by the OOB platform switch independent of the operating system and the processor.

2. The method of claim 1 wherein the OOB platform switch includes an OOB management controller that includes the OOB network interface.

3. The method of claim 1 wherein the OOB platform switch includes an OOB platform switch agent executed by a first virtual machine hosted by the computer system, and wherein the OOB network interface is controlled by the OOB platform switch agent.

4. The method of claim 3 wherein the OOB network interface is a network interface that is timeshared between the first virtual machine and a second virtual machine of the computer system.

5. The method of claim 4 wherein the first and second virtual machines are supported by a virtual machine manager, the first and second virtual machines and the virtual machine manager facilitated by execution of firmware components.

6. The method of claim 1 wherein determining the next hop includes performing a routing lookup in the routing table.

7. The method of claim 6, further comprising:
receiving routing information from the network via the OOB network interface; and
incorporating the routing information into the routing table.

8. The method of claim 6, further comprising broadcasting routing information stored in the routing table over the network via the OOB network interface.

9. The method of claim 8 wherein the routing information is broadcast in response to receiving notification at the computer system that the OOB platform switch is to be removed from the network.

10. The method of claim 1 wherein the OOB platform switch is enabled to receive and to forward packets when the computer system is in a sleep state.

11. An article of manufacture comprising:
a machine-accessible memory including a plurality of instructions which when executed perform operations comprising:
receiving a packet at an out-of-band (OOB) network interface of an OOB platform switch hosted by a computer system coupled to a network, wherein the OOB platform switch operates independent of an operating system of the computer system, a processor of the computer system executing the operating system during an operating system runtime that occurs after a pre-boot phase of the computer system, the pre-boot phase being between a reset of the processor and loading of the operating system;
performing, during the pre-boot phase, at least one of layer-2 and layer-3 store-and-forward switching of the received packet, the performing including:
identifying, by examination of the received packet, a destination of the received packet;
using a routing table stored at the computer system to determine a next hop along a path the received packet may be routed to reach the received packet's destination, the routing table containing next hop information that is updated when conditions in the network change; and
forwarding the received packet via the OOB network interface to the next hop;
the identifying of the destination of the received packet and the determining of the next hop being accomplished by the OOB platform switch independent of the operating system and the processor.

12. The article of manufacture of claim 11 wherein execution of the plurality of instructions further perform operations comprising:
providing an OOB platform switch agent supported by a first virtual machine hosted by the computer system, and controlling the OOB network interface via the OOB platform switch agent.

13. The article of manufacture of claim 11 wherein execution of the plurality of instructions further perform operations comprising:
receiving routing information at the OOB network interface; and
incorporating the routing information into the routing table.

14. The article of manufacture of claim 11 wherein execution of the plurality of instructions further perform operations comprising:
broadcasting routing information stored in the routing table over the network via the OOB network interface.

15. The article of manufacture of claim 14 wherein execution of the plurality of instructions further perform operations comprising:
receiving notification over the OOB network interface that the OOB platform switch is to be removed from the network; and in response thereto,
broadcasting the routing information over the network via the OOB network interface.

16. The article of manufacture of claim 11 wherein the plurality of instructions are embodied as firmware code that is to be executed by an OOB management controller of the computer system.

17. A computer system, comprising:
a first processor to execute an operating system during an operating system runtime that occurs after a pre-boot phase of the computer system, the pre-boot phase being between a reset of the first processor and loading of the operating system;
an out-of-band (OOB) platform switch comprising an OOB management controller, the OOB management controller including:
a second processor; and
an OOB Ethernet network interface coupled to the second processor; and
a storage unit coupled to the OOB management controller having a plurality of instructions stored therein that if executed by the second processor perform, during the pre-boot phase, at least one of layer-2 and layer-3 store-and-forward switching of a received packet, the switching including operations comprising:
receiving the packet at the OOB Ethernet network interface;
identifying, by examination of the received packet, a destination of the received packet;
determining a next hop of the received packet along a path to the received packet's destination, the determining comprising use of a routing table that contains next hop information that is updated when network conditions change; and
forwarding the received packet to the next hop via the OOB Ethernet network interface;
the determining of the next hop being accomplished by the OOB platform switch independent of the operating system and the first processor.

18. The system of claim 17 wherein the OOB management controller is capable of performing packet switching operations when the first processor is in a sleep state.

19. The system of claim 17 wherein execution of the plurality of instructions further perform operations comprising:
performing a routing table lookup in the routing table stored on the computer system to determine the next hop.

20. The system of claim 19 wherein execution of the plurality of instructions further perform operations comprising:
receiving routing information over the network via the OOB Ethernet network interface; and
incorporating the routing information into the routing table.

21. A computer system, comprising:
an in-band processor coupled to a chipset, the in-band processor being to execute an operating system during an operating system runtime that occurs after a pre-boot phase of the computer system, the pre-boot phase being between a reset of the in-band processor and loading of the operating system;
an in-band network interface coupled to the chipset;
an out-of-band (OOB) management controller coupled to the chipset, the OOB management controller including:
an OOB processor; and
an OOB network interface coupled to the OOB processor; and
a storage unit coupled to the OOB management controller having a plurality of instructions stored therein that if executed by the OOB processor perform, during the pre-boot phase, at least one of layer-2 and layer-3 store-and-forward switching of a received packet, the switching including operations comprising:

receiving the packet at the OOB network interface;

identifying, by examination of the received packet, a destination of the received packet;

determining a next hop of the received packet along a path to the received packet's destination, the determining comprising use of a routing table that contains next hop information that is updated when network conditions change; and forwarding the received packet to the next hop via the OOB network interface;

the determining of the next hop being accomplished by the OOB processor independent of the operating system and the in-band processor.

22. The system of claim 21 wherein the OOB management controller is capable of performing the switching when the in-band network interface is in a sleep state.

23. The system of claim 21 wherein the chipset includes an Input/Output Controller Hub (ICH) and a Memory Controller Hub (MCH), the in-band network interface and the OOB management controller coupled to the ICH.

24. The system of claim 21 wherein OOB management controller is an integrated component of the chipset.

* * * * *

UNITED STATES PATENT AND TRADEMARK OFFICE
CERTIFICATE OF CORRECTION

| | | |
|---|---|---|
| PATENT NO. | : 7,542,467 B2 | Page 1 of 1 |
| APPLICATION NO. | : 11/092207 | |
| DATED | : June 2, 2009 | |
| INVENTOR(S) | : Michael A. Rothman et al. | |

It is certified that error appears in the above-identified patent and that said Letters Patent is hereby corrected as shown below:

In column 13, line 1, in Claim 8, delete "farther" and insert -- further --, therefor.

Signed and Sealed this

Fourth Day of August, 2009

JOHN DOLL
*Acting Director of the United States Patent and Trademark Office*